United States Patent
Simpson et al.

(10) Patent No.: US 10,356,889 B1
(45) Date of Patent: Jul. 16, 2019

(54) PASSIVE METHOD FOR CONTROLLING AND CORRECTING ENERGY CORRELATIONS IN CHARGED PARTICLE BEAMS

(71) Applicant: Euclid Tech Labs, LLC, Gaithersburg, MD (US)

(72) Inventors: James Simpson, Fountain Hills, AZ (US); Michael Rosing, Madison, WI (US); Alexander Zholents, Darien, IL (US); Sergey Antipov, Darien, IL (US); Chunguang Jing, Naperville, IL (US); Paul Schoessow, Lakewood, CO (US); Alexei Kanareykin, Gaithrsburg, MD (US)

(73) Assignee: EUCLID TECHLABS LLC, Solon, OH (US)

( * ) Notice: Subject to any disclaimer, the term of this patent is extended or adjusted under 35 U.S.C. 154(b) by 379 days.

(21) Appl. No.: 14/075,380

(22) Filed: Nov. 8, 2013

Related U.S. Application Data

(60) Provisional application No. 61/724,440, filed on Nov. 9, 2012.

(51) Int. Cl.
  *H05H 7/00* (2006.01)
  *H05H 9/00* (2006.01)
  *H01S 4/00* (2006.01)

(52) U.S. Cl.
  CPC ............... *H05H 7/001* (2013.01); *H01S 4/00* (2013.01); *H05H 9/00* (2013.01); *H05H 2007/004* (2013.01)

(58) Field of Classification Search
  CPC ............... H05H 7/00; H05H 7/22; H01J 25/02
  USPC .................................................. 315/500–505
  See application file for complete search history.

(56) References Cited

U.S. PATENT DOCUMENTS

| | | | | |
|---|---|---|---|---|
| 6,285,690 B1 * | 9/2001 | Kim | ..................... | H01S 3/0903 359/335 |
| 8,508,319 B1 * | 8/2013 | Newsham | ................ | H01P 1/30 333/231 |
| 8,564,225 B1 * | 10/2013 | Hailey | .................. | H05H 9/042 315/500 |
| 8,922,208 B1 * | 12/2014 | Kanareykin | ........... | G01R 33/02 324/260 |

(Continued)

OTHER PUBLICATIONS

Thompson et al PRL 100 214801 (2008) Breakdown limits on Gigavolt per meter electron beam driven wakefields in dielectric structures.*

(Continued)

*Primary Examiner* — Douglas W Owens
*Assistant Examiner* — Srinivas Sathiraju
(74) *Attorney, Agent, or Firm* — John Gugliotta

(57) ABSTRACT

A technique for controlling and compensating the energy spread of a charged particle beam is provided. This technique is based on a passive dielectric-loaded structure that redistributes the energy within the bunch by means of the wakefield generated in the structure. Cylindrical and planar structure configurations are provided and also means for electrical and mechanical tuning to optimize performance. The instant abstract is neither intended to define the invention disclosed in this specification nor intended to limit the scope of the invention in any way.

11 Claims, 2 Drawing Sheets

(56) References Cited

U.S. PATENT DOCUMENTS

| | | | | |
|---|---|---|---|---|
| 2005/0147147 A1* | 7/2005 | Umstadter | ............... | H01S 3/30 372/73 |
| 2005/0221358 A1* | 10/2005 | Carrillo | ............... | B01L 3/5027 435/6.16 |
| 2007/0138980 A1* | 6/2007 | Sanders | .................. | H05H 7/00 315/505 |
| 2009/0146085 A1* | 6/2009 | Smirnov | ............... | H01J 25/02 250/504 R |
| 2010/0261946 A1* | 10/2010 | Kaplan | ............. | A61K 41/0038 600/8 |

OTHER PUBLICATIONS

A Kannareykin et al Proceedings of the 2003 Particle accelerator conference p. 1897 A double layered planar dielectric loaded accelerator structure.*

Jing et al Experimental Demonstration of Wakefield acceleration in a Tunable Dielectric loaded accelerating structure PRL 106, 164802p. 1-3, 2011.*

"Experimental Demonstration of wakefield acceleration in a tunable dielectric loaded accelerating structure" by C. Jing et al (Jing); (Apr. 22, 2011 Physical Review Letters 106, 164802 p. 1-3 2011).*

"Low-loss Ferroelectric for Accelerator applications" by A. Kannareykin (Kannareykin) et al Proceedings of the 2005 Particle accelerator Conference p. 4305-4307.*

A Double-Layered planar dielectric loaded accelerating structure by A. Kannareykin (K2) Proceedings of the 2003 Particle accelerator IEEEE Conference proceedings p. 1897 to 1899.*

* cited by examiner

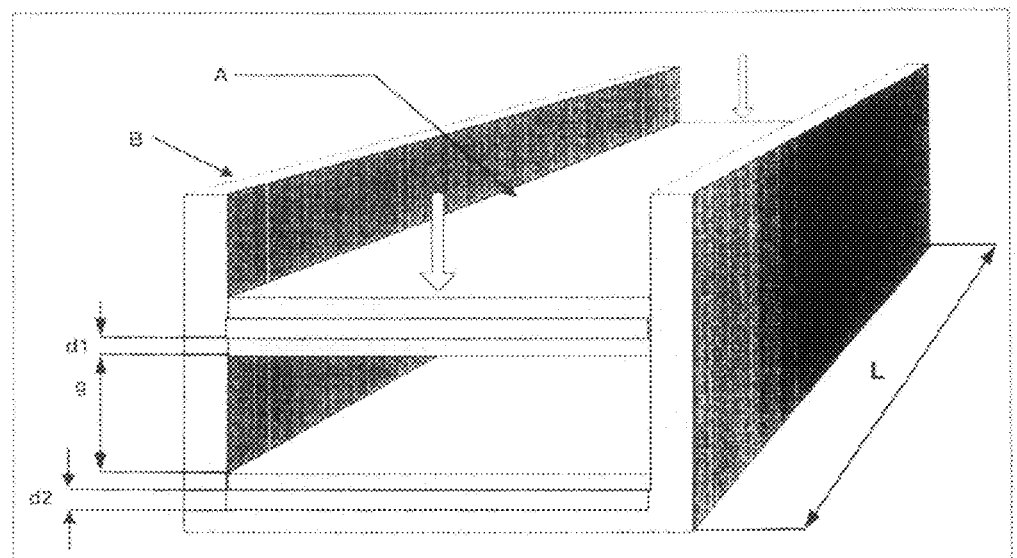

PASSIVE METHOD FOR CONTROLLING AND CORRECTING ENERGY CORRELATIONS IN CHARGED PARTICLE BEAMS

RELATED APPLICATIONS

The present application claims benefit of U.S. Ser. No. 61/724,440, filed on Nov. 9, 2012 and incorporated by reference as if fully rewritten herein.

STATEMENT AS TO RIGHTS TO INVENTIONS MADE UNDER FEDERALLY-SPONSORED RESEARCH AND DEVELOPMENT (IF ANY)

This invention was made with government support under a contract awarded by the Department of Energy, grant number DE-SC00011960. The government has certain rights in the invention.

BACKGROUND OF THE INVENTION

1. Technical Field of the Invention

The present invention relates generally to the technical field of particle accelerator design and engineering and, in particular, to a method for controlling and correcting energy correlations in charged particle beams for high performance linear accelerators.

2. Description of the Related Art

Short, subpicosecond pulses are central to many of the next generation light source initiatives that are typical of linear accelerators. The free electron laser (FEL) is considered to be the main candidate for future short wavelength (UV to X-ray), short pulse (femto- to attosecond) light sources. Demands on the electron beam needed to drive this class of FELs are very challenging with present technologies. In particular, a small intrinsic chirp is present at the output of the last bunch compression stage of the linac to compensate for wakefield effects through the rest of the accelerator. It is required that this energy spread be compensated using a specially designed device.

A key consideration for linac optimization, as an example, for the UK NLS (Soft X-Ray FEL), Berkeley XUV plasma accelerator driven concept etc., is to reduce the final energy chirp on the electron bunch in the FEL train, ideally keeping it below the intrinsic SASE bandwidth. This requirement is particularly challenging for L-Band linacs, where the wakefields are reduced compared to normal-conducting S-Band linacs and cannot be used to remove the energy chirp. Attempts to operate the RF cavities beyond-crest after the final bunch compressor have also proved ineffective due to the short bunch length. As such, the optimization has been carried out in such a way as to minimize the initial size of energy chirp imprinted on the beam by running the RF cavities close to on-crest, and compensating for the reduced energy chirp with an increase in bunch compressor strength. However, in this scheme care has to be taken in order to avoid increasing the sensitivity of the linac to jitter.

One common method would be the use of the beam's self-wakefield in the linac itself to correct the energy spread. The reduced wakes of the SRF linac do not allow compensation of the energy spread that is left over at the output of the last compressor for wakefield effects through the rest of the accelerating stage. Another approach is the use of an extra powered rf cavity phased so that the beam experiences a zero-crossing of the rf so that the chirp is removed. This active technique requires an additional cavity and rf power source, possibly at a different frequency from the linac rf. While workable, this solution adds considerably to the overall cost of the linac.

In such embodiments, the use of existing technologies to eliminate the energy chirp involves increased cost and complexity of the system. This is particularly problematic for the use of XFELs as turnkey research instruments. Given the anticipated user demand for these facilities, system reliability is an important consideration. The use of a passive energy correction technique as presented here improves the system performance without impacting reliability unlike existing technologies.

Further, present technology methods for beam energy correction lack flexibility in adapting to a range of beam lengths and energy profiles, required for optimization of system performance.

Further still, the paucity of control options in existing compensation schemes impacts maintenance of long term system stability and hence accuracy and replicability of user measurements.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Consequently, a need has been felt for providing an apparatus and method for compensating and controlling the energy spread in a charged particle beam by spatially redistributing the energy within the beam.

SUMMARY OF THE INVENTION

It is therefore an object of the present invention to provide an improved a new type of dielectric rf cavity or resonator through which a charged particle beam is passed.

It is a feature of the present invention to provide an improved dielectric rf cavity or resonator through which a charged particle beam is passed in which during its passage the beam emits Cherenkov radiation (wakefield) that couples to the modes of the cavity. By appropriate design of the cavity (selection of the dielectric permittivity of the loading material, beam channel size, size of the dielectric and length of the structure) part of the energy of the leading portion of the bunch can be made to be absorbed by the trailing portion, thus equalizing the energy within the bunch.

Briefly described according to one embodiment of the present invention, a technology for the basis of a passive (not requiring an external source of rf) device for redistributing energy within a charged particle bunch to remove a spatial energy correlation within the bunch. A short relativistic electron bunch is passed through a planar or cylindrical dielectric cavity. By appropriate design of the cavity an undesirable head-tail energy correlation of the electron bunch can be compensated by transferring energy from the head to the tail by means of the wakefield in the cavity. The characteristics of this device are controllable by changing the aperture (for a planar configuration) or modifying the dielectric properties of the cavity through the use of an electrical or thermally controlled ferroelectric layer. Further, the need to compensate the difference between the energy of the head and tail regions of a charged particle bunch can improve the performance of many linear accelerator applications but is especially relevant for achieving the design requirements of X-Ray free electron lasers.

The application of this technology is for improving the beam quality of any type of linear accelerator. Some specific examples are (1) superconducting rf (SRF) electron linacs used to power X-Ray free electron lasers: the undesirable energy "chirp" of the electron beam that limits the performance of the XFEL can be eliminated over short distances of 10-20 cm by this invention; (2) laser plasma accelerators where the extremely short wavelengths involved tend to produce electron beams with large energy spread and very strong longitudinal correlations. The invention and also provides fine tuning of the basic correction parameters (wakefield magnitude and profile).

In accordance with a preferred embodiment, the aim of said invention is to enable the reduction of the position-correlated energy spread within a short electron bunch produced by a linear accelerator and that in turn would considerably improve the performance of an X-Ray free electron laser employing the corrected electron beam as a power source.

The advantages of the present invention include, without limitation, that it is versatile, compact and can be used to form the basis for a number of devices to correct and compensate the energy spread of a charged particle beam exiting a linear accelerator. The basic technology forms the basis for the following classes of devices:
  a. a planar energy compensating cavity consisting of two dielectric slabs separated by a beam gap;
  b. a planar energy compensating cavity consisting of two dielectric slabs separated by an adjustable beam gap to control the energy-compensating parameters of the cavity;
  c. a planar energy compensating cavity consisting of two dielectric slabs separated by a beam gap and incorporating slabs of a nonlinear ferroelectric material. The energy-compensating parameters of the cavity are controlled by changing the permittivity of the ferroelectric layer either by adjusting the temperature and/or a dc electric potential difference applied across the ferroelectric layer;
  d. a cylindrical energy compensating cavity consisting of a dielectric cylinder with an axial beam channel; and
  e. a cylindrical energy compensating cavity consisting of a dielectric cylinder with an axial beam channel incorporating a layer of a nonlinear ferroelectric material. The energy-compensating parameters of the cavity are controlled by changing the permittivity of the ferroelectric layer either by adjusting the temperature and/or a dc electric potential difference applied across the ferroelectric layer.

In accordance with a preferred embodiment, the aim of said invention is to enable the devices described in points a-e above.

The advantages of the present invention include, without limitation, that it is able to reliably and inexpensively compensate and correct the position correlated energy spread of a charged particle beam. The use of energy emitted by the beam itself to perform this compensation eliminates the need for an external power source for the device.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1 is a diagram of a planar energy compensating structure showing the methods for controlling its parameters;

FIG. 2 is a diagram of a cylindrical energy compensating structure showing the methods for controlling its parameters;

DESCRIPTION OF THE PREFERRED EMBODIMENTS

Figure 3A:
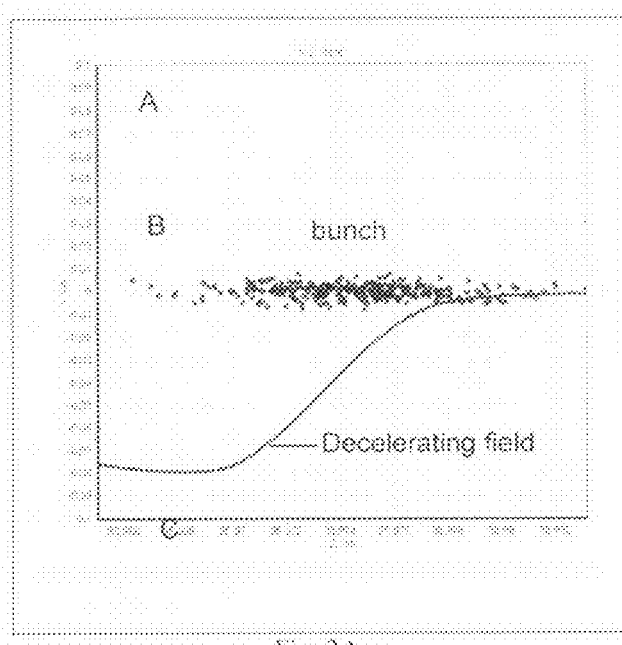
FIG. 3a is a numerical calculation of the wakefield in the energy compensator showing the principle of compensating the energy spread of a charged particle beam.

Briefly described according to a broad embodiment of the present invention, geometric configurations and methods of adjusting the characteristics of the aforementioned device are provided. The best mode for carrying out the invention is presented in terms of its preferred embodiment, herein depicted within the Figures.

1. Detailed Description of the Figures

A wakefield is the electromagnetic wave emitted by a charged particle passing through a resonant structure. In the case of the dielectric loaded cavities considered here the radiation is emitted via the Cherenkov effect. The radiation couples to the resonant modes of the cavity. In the case of a charged particle bunch the wakefields of the particles add collectively. Particles in the bunch experience different retarding or accelerating forces depending on their relative positions within the bunch. The magnitude and sign of the force on a given particle depends on a number of factors: the total charge of the bunch; the axial distribution of particles; and the mode structure of the cavity.

Because of the position-dependent wakefield force within the bunch, the initial energy distribution in the bunch will be modified as it passes through the cavity according to its position within the bunch. (The particles are assumed to be sufficiently relativistic so that the relative positions of the particles do not change during the passage of the bunch through the cavity.)

Thus by appropriate choice of cavity parameters, the energy distribution along the bunch can be controlled. In particular, undesirable energy-position correlations present initially in a charged particle bunch can be suppressed.

In order to accomplish the teachings and benefits of the present disclosure, an appropriate design methodology for an energy "silencer" compensator needed to be developed. Because of the previously mentioned complex dependence of the design on beam and structure parameters, simulation software was developed to model the entire process of the particle beam passing through a rectangular or cylindrical dielectric cavity. Analytic solutions to Maxwell's equations were obtained for both geometries. The code then evaluates the analytic expressions for the forces and uses the numerical results to advance a group of macroparticles with the desired initial spatial and energy distribution through the dielectric device geometry being evaluated.

An important feature of an energy silencer is to provide a dielectric energy compensator that has he capability to adjust the parameters of the cavity to optimize its performance. This is made possible through adjusting the effective permittivity of the dielectric by incorporating temperature or electric-field sensitive ferroelectric layers into it. Additionally, the planar geometry also permits the option of adjusting the cavity by mechanically changing the aperture of its beam channel.

Referring to FIG. 1, a diagram of the planar (rectangular) geometry energy correction cavity concept is shown. A movable conducting wall (A) is fitted to move inside a rectangular conducting channel (B) of length L. Mounted in the channel and movable wall are parallel dielectric (d1) and ferroelectric (d2) slabs running the length of the channel. The beam to be compensated travels down the adjustable gap (g) between the dielectric slabs. The interior ferroelectric slabs (d2) are optional but can be used as an additional means of tuning the structure. The permittivity of the ferroelectric is a function of the temperature, so the wakefield frequency spectrum of the structure can be changed by external thermal control of the cavity. A DC electric field across the ferroelectric slabs can be applied using electrodes thinner than the skin depth over the range of wakefield frequencies present to adjust the permittivity and hence tune the structure.

Next, referring to FIG. 2, is a diagram of a cylindrical geometry energy compensation cavity. Concentric dielectric cylinders (a,b) are inserted into a conducting sleeve (c). A cylindrical beam channel (d) is located on axis. Since in this geometry there is no method to conveniently tune the structure by adjusting the gap, a layer of ferroelectric (a) is present to permit either thermal or electrical tuning as in the aforementioned planar geometry.

Referring now to FIG. 3A, a sketch of the principle of operation of the device is provided in which the longitudinal wakefield as a function of position along the particle bunch is sketched in blue. The decelerating field in this case increases nearly linearly along the bunch; thus in this case particles to the back of the bunch are decelerated more than those at the head, providing compensation for a linear and increasing position energy correlation as shown in FIG. 3B.

Figure 3B:
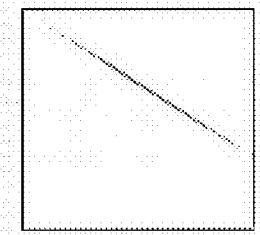
FIG. 3b shows the longitudinal phase space of a simulated electron beam prior to entering the energy compensator.
Figure 3C:
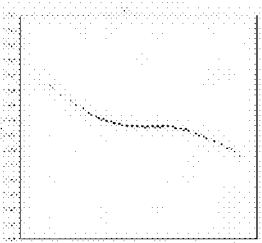
FIG. 3c shows the longitudinal phase space of a simulated electron beam at the exit of the energy compensator.

FIG. 3C shows the results of passing the beam of FIG. 3B through an optimized energy compensator. With the exception of a small number of particles at the head and tail of the bunch, the energy correlation is removed and the bunch energy distribution flattened.

2. Operation of the Preferred Embodiment

Figure 4:
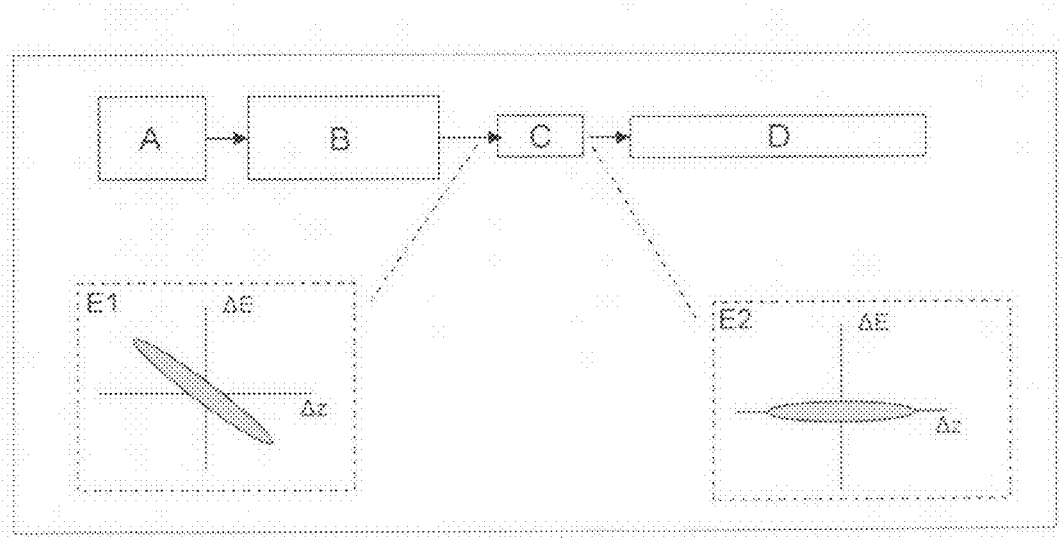
FIG. 4 is a sketch of an energy compensated particle accelerator concept according to an exemplary embodiment of the present invention.

In operation, FIG. 4 shows generally a block diagram of a possible application of the energy compensator in a linear accelerator. Particles produced in a source (A) are injected into a linear accelerator (B). Callout E1 shows the longitudinal phase ellipse of the particle bunch exiting the linear accelerator, possessing an undesirable tilt or equivalently an energy chirp. After passing through an appropriately designed and adjusted energy compensator (C), the energy chirp is removed and the phase ellipse has been rotated to remove the tilt (Callout E2). The corrected beam then is transported to the device (D) (e.g. an undulator) requiring an unchirped beam.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A passive electromagnetic resonator used to condition a charged particle beam by redistributing its energy comprising:
    a passive dielectric cavity that redistributes an energy of a charged particle bunch passing through it by means of a wakefield induced in the structure by said particle bunch, wherein energy is thereby redistributed in such a way as to reduce the energy spread of the bunch by removing the longitudinal energy-position correlation.

2. The passive electromagnetic resonator of claim 1, wherein said passive dielectric cavity further comprises a planar geometry dielectric structure adapted to be tuned to produce an optimized bunch energy spread, wherein the mechanism of tuning is selected from the group consisting of one or more of the following: altering the beam channel aperture in the structure; use of a thin ferroelectric layer incorporated into the dielectric structure to electrically control the effective permeability of the structure; and use of a thin ferroelectric layer incorporated into the dielectric structure to thermally control the effective permeability of the structure.

3. The passive electromagnetic resonator of claim 1, wherein said passive dielectric cavity further comprises a cylindrical geometry dielectric structure that can be tuned to produce an optimized bunch energy spread, wherein the mechanism of tuning is selected from the group consisting of one or more of the following: altering the beam channel aperture in the structure; use of a thin ferroelectric layer incorporated into the dielectric structure to electrically control the effective permeability of the structure; and use of a thin ferroelectric layer incorporated into the dielectric structure to thermally control the effective permeability of the structure.

4. The passive electromagnetic resonator of claim 1 adapted for use in improving the performance of an X-Ray free electron laser.

5. The passive electromagnetic resonator of claim 1 adapted for use in improving the performance of a linear accelerator based system.

6. The passive electromagnetic resonator of claim 2 adapted for use in improving the performance of an X-Ray free electron laser.

7. The passive electromagnetic resonator of claim 2 adapted for use in improving the performance of a linear accelerator based system.

8. A method to compensate and correct the position correlated energy spread of a charged particle beam through the use of conditioning the particle beam by redistribution of energy inside a bunch and thereby eliminating the need for an external power source for the device.

9. An apparatus for practicing the method of claim 8.

10. The passive electromagnetic resonator of claim 3 adapted for use in improving the performance of an X-Ray free electron laser.

11. The passive electromagnetic resonator of claim 3 adapted for use in improving the performance of a linear accelerator based system.

* * * * *

UNITED STATES PATENT AND TRADEMARK OFFICE
CERTIFICATE OF CORRECTION

PATENT NO. : 10,356,889 B1
APPLICATION NO. : 14/075380
DATED : July 16, 2019
INVENTOR(S) : James Simpson et al.

Page 1 of 1

It is certified that error appears in the above-identified patent and that said Letters Patent is hereby corrected as shown below:

In the Specification

Replace the paragraph beginning in Column 1, Line 16, with the following paragraph:
This invention was made with government support under DE-SC0006299 awarded by the U.S. Department of Energy. The government has certain rights in the invention.

Signed and Sealed this
Eleventh Day of July, 2023

Katherine Kelly Vidal
*Director of the United States Patent and Trademark Office*